US 6,237,471 B1

(12) United States Patent
Nam

(10) Patent No.: US 6,237,471 B1
(45) Date of Patent: May 29, 2001

(54) FOLDING HANDLE ASSEMBLY FOR COOKING PANS

(76) Inventor: Kyoung Ho Nam, 3-2 87 Sangok1-dong, Book-gu, Inchon-shi 403-833 (KR)

( * ) Notice: Subject to any disclaimer, the term of this patent is extended or adjusted under 35 U.S.C. 154(b) by 0 days.

(21) Appl. No.: 09/624,386

(22) Filed: Jul. 27, 2000

(30) Foreign Application Priority Data

Jul. 30, 1999 (KR) .................................................. 99-15518

(51) Int. Cl.[7] .............................. A47J 27/00; A47J 37/00; A47J 45/06; A47J 45/07; A47J 45/10
(52) U.S. Cl. ............................... 99/422; 99/340; 99/403; 99/449; 16/111.1; 16/425; 16/DIG. 41
(58) Field of Search .......................... 99/337, 338, 340, 99/403, 410, 422, 425, 449, 646 R; 16/425, DIG. 41, 110.1, 111.1, 422, 434, 444; 126/390, 369, 373; 220/316, 735, 752, 755, 759, 912; 294/30, 57, 58, 19.1, 25, 1.1; D7/357, 361, 395

(56) References Cited

U.S. PATENT DOCUMENTS

| | | | |
|---|---|---|---|
| 4,014,129 | * | 3/1977 | Capra .................................. 99/422 X |
| 4,171,144 | * | 10/1979 | Rodriguez ............................... 294/30 |
| 4,574,777 | * | 3/1986 | Bohl et al. .......................... 99/425 X |
| 4,653,468 | * | 3/1987 | Lemme et al. ........................ 126/373 |
| 4,711,366 | * | 12/1987 | Chen .................................. 99/337 X |
| 4,822,087 | * | 4/1989 | DeCarlo ................................. 294/58 |
| 4,926,521 | * | 5/1990 | Gagnepain .......................... 16/430 X |
| 5,125,130 | * | 6/1992 | Stanish .................................. 16/430 |
| 5,313,735 | * | 5/1994 | Latouche ........................... 99/449 X |
| 5,365,832 | * | 11/1994 | Gaydoul ................................. 99/422 |
| 5,373,608 | * | 12/1994 | Welch ................................ 99/403 X |
| 5,673,458 | * | 10/1997 | Raoult .................................. 16/425 |
| 5,715,570 | * | 2/1998 | Hyun .................................. 16/110.1 |

* cited by examiner

Primary Examiner—Timothy F. Simone
(74) Attorney, Agent, or Firm—Staas & Halsey LLP

(57) ABSTRACT

A folding handle assembly for cooking pans is disclosed. In the handle assembly, a bracket, mounted to the external surface of a cooking pan, is formed by pressing a steel plate to have a horizontal fitting hole and two opposite stoppers. A folding handle is movably assembled with the bracket. This folding handle is formed by specifically and symmetrically bending a steel wire to have two opposite fitting ends, two snap arms and a handle body. The handle is hinged to the opposite ends of the fitting hole of the bracket at its opposite fitting ends, and selectively, elastically caught by the two stoppers of the bracket at its two snap arms, and is gripped by a hand at its handle body. A coil spring is seated within the fitting hole of the bracket at a position between the two fitting ends of the handle, thus normally biasing the two fitting ends of the handle outwardly in opposite directions to allow the snap arms of the handle to be reliably caught by the stoppers of the bracket.

1 Claim, 3 Drawing Sheets

FOLDING HANDLE ASSEMBLY FOR COOKING PANS

BACKGROUND OF THE INVENTION

1. Field of the Invention

The present invention relates to a folding handle assembly for cooking pans, such as outdoor frying pans or outdoor saucepans, and, more particularly, to a folding handle assembly for such cooking pans, fabricated by hinging a specifically and symmetrically bent wire handle to a bracket to allow the handle to be selectively closed onto the top of a cooking pan, the handle assembly of this invention being specifically designed to reliably maintain its desired elasticity for a lengthy period of time.

2. Description of the Prior Art

FIG. 1 is an exploded perspective view of a frying pan with a conventional folding handle assembly. As shown in the drawing, the conventional folding handle assembly for cooking pans comprises a handle bracket 10 and a folding handle 20.

The bracket 10 is a single body, which is mounted to a cooking pan at a desired position and has a fitting hole 11 and two stoppers 12. The handle 20 is a wire member, which is specifically and symmetrically bent to form an elastic structure consisting of opposite fitting ends 21, two snap arms 22 and one handle body 23.

That is, the bracket 10 is formed by pressing a steel plate and is mounted to a desired position on the external surface of the cooking pan through a riveting process, a screwing process or a welding process. The handle 20 is formed by specifically and symmetrically bending a steel wire, having a desired length, in a way such that the handle 20 has a desired elasticity. This handle 20 is assembled with the bracket 10 into a desired folding handle assembly by inserting the opposite fitting ends 21 of the handle 20 into the opposite ends of the fitting hole 11 of the bracket 10.

When the handle 20 is assembled with the bracket 10 by inserting the opposite fitting ends 21 of the handle 20 into the two fitting holes 11 of the bracket 10, the two snap arms 22 of the handle 20 can be elastically caught by or released from the inner surfaces of the two stoppers 12 of the bracket 10. The handle 20 can be thus elastically opened or closed relative to the handle 20 as desired.

Therefore, when the handle 20 is fully opened with the two snap arms 22 being elastically caught by the inner surfaces of the two stoppers 12, it is possible for a user to safely move the cooking pan while cooking, with the handle body 23 being gripped by a hand. When the handle 20 is compressed by a hand to reduce the gap between the two snap arms 22, the two snap arms 22 of the handle 20 are released from the two stoppers 12 of the bracket, thus allowing the user to rotate the handle 20 upwardly around the fitting hole 11 of the bracket 10 and to close the handle 10 onto the top of the cooking pan.

While moving such a cooking pan containing hot food with the folding handle 20 being gripped by a hand, it is necessary for the snap arms 22 of the handle 20 to be continuously and firmly caught by the stoppers 12 of the bracket 10. However, when the gripping force applied to the handle body 23 during a movement of the pan carelessly exceeds a predetermined level, the snap arms 23 may be released from the stoppers 12 and allows the handle 20 to be unexpectedly collapsed, thus being dangerous to the user. Particularly, it is necessary for users to grip the handle body 23 with somewhat exceeding force in order to prevent an unexpected dropping of the pan when the pan is somewhat heavy due to food contained in the pan. In such a case, the snap arms 23 of the handle 20 are more easily released from the stoppers 12 of the bracket, thus being very inconvenient and dangerous to users while using the cooking pans having such folding handles 20.

In addition, the elasticity of the folding handle 20 is more quickly reduced as the length of the handle 20 is increased. Therefore, it is very difficult to maintain a desired elastic engagement of the folding handle 20 with the bracket 10 for a desired period of time, but the handle 20 may be easily and unexpectedly played relative to the bracket 10.

SUMMARY OF THE INVENTION

Accordingly, the present invention has been made keeping in mind the above problems occurring in the prior art, and an object of the present invention is to provide a folding handle assembly for cooking pans, which is designed to maintain the elasticity of its folding handle for a lengthy period of time, thus preventing the snap arms of the folding handle from being unexpectedly released from the stoppers of the bracket and allowing users to more easily and safely handle such cooking pans.

In order to accomplish the above object, the present invention provides a folding handle assembly for cooking pans, comprising a bracket mounted to the external surface of a cooking pan at a desired position, the bracket being formed by pressing a steel plate to have a horizontal fitting hole and two opposite stoppers, the stoppers being formed at positions around opposite ends of the fitting hole, a folding handle movably assembled with the bracket, the folding handle being formed by specifically and symmetrically bending a steel wire to have two opposite fitting ends, two snap arms and a handle body, the folding handle being hinged to the opposite ends of the fitting hole of the bracket at its opposite fitting ends and selectively, elastically caught by the inner surfaces of the two stoppers of the bracket at its two snap arms, and being gripped by a hand at its handle body as desired, and a coil spring seated within the fitting hole of the bracket at a position between the two fitting ends of the handle, thus normally biasing the two fitting ends of the handle outwardly in opposite directions to allow the snap arms of the handle to be reliably caught by the stoppers of the bracket.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
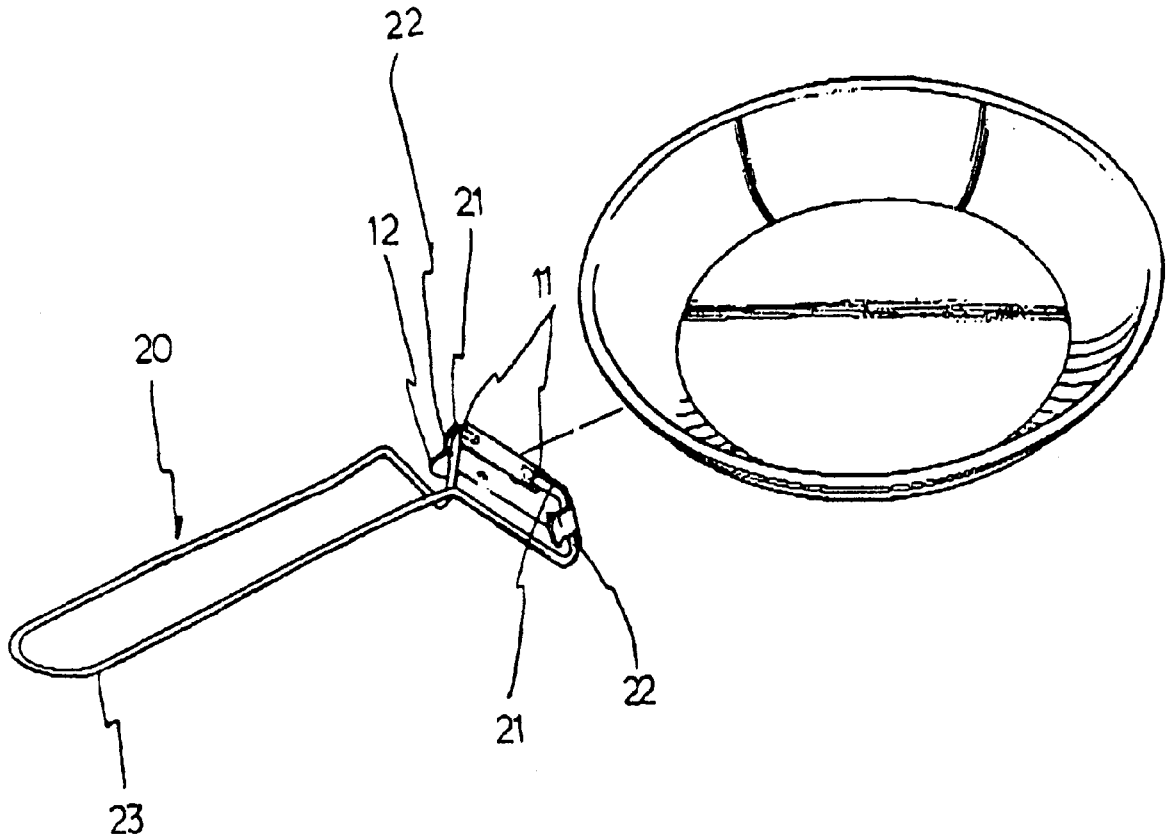
FIG. 1 is an exploded perspective view of a frying pan with a conventional folding handle assembly.
Figure 2:
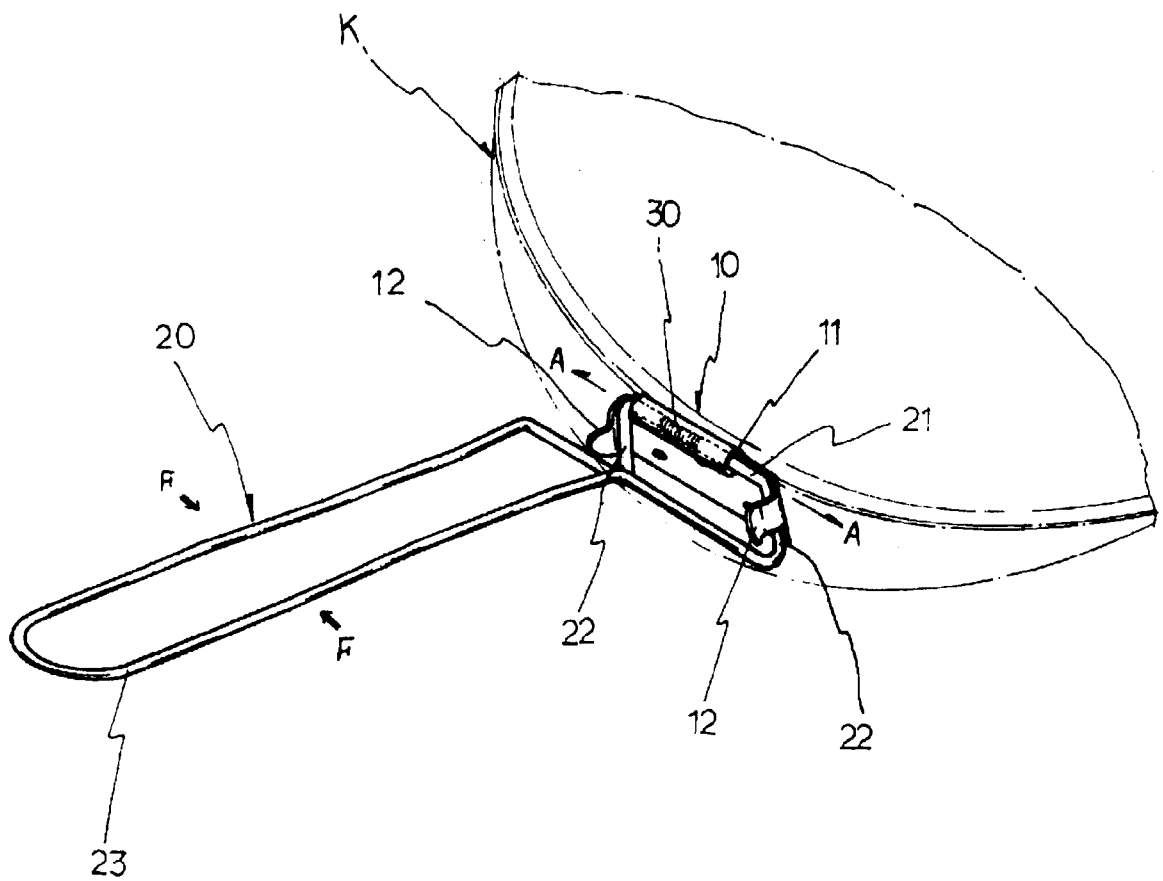
FIG. 2 is a perspective view of a frying pan with a folding handle assembly in accordance with the preferred embodiment of the present invention.
Figure 3:
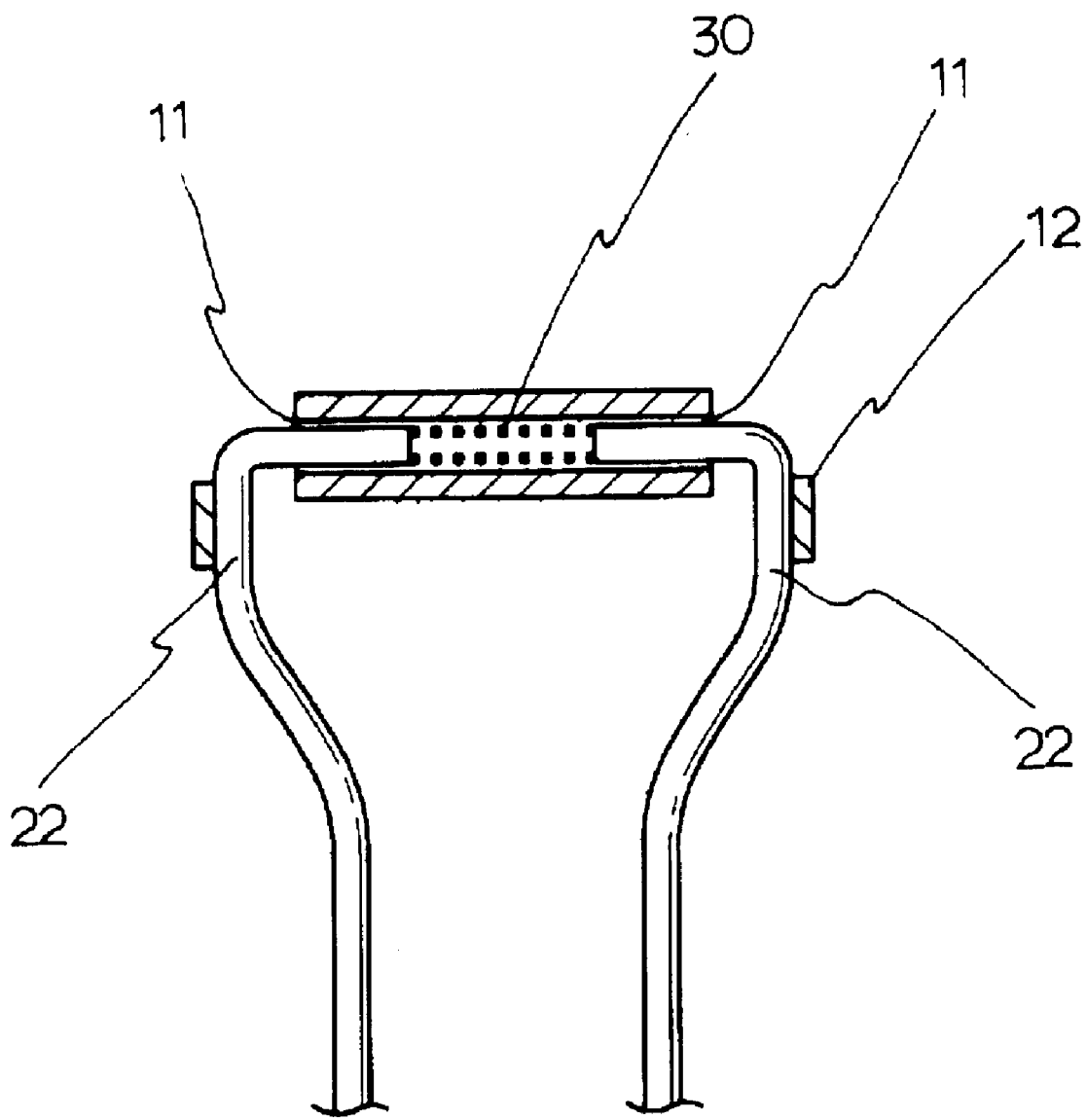
FIG. 3 is a sectional view of the folding handle assembly taken along line A—A of FIG. 2.

FIG. 2 is a perspective view of a frying pan with a folding handle assembly in accordance with the preferred embodiment of the present invention. FIG. 3 is a sectional view of the folding handle assembly taken along line A—A of FIG. 2.

As shown in the drawings, the folding handle assembly for cooking pans according to this invention comprises a handle bracket 10 and a folding handle 20. In the same manner as that described for the prior art, the bracket 10 is a single body, which is formed by pressing a steel plate to have a fitting hole 11 and two opposite stoppers 12 and is mounted to the external surface of a cooking pan "K" at a desired position through a riveting process, a screwing process or a welding process.

The handle 20 has the same construction as that described for the prior art. That is, this handle 20 is a steel wire member, which is specifically and symmetrically to form an elastic structure consisting of opposite fitting ends 21, two snap arms 22 and one handle body 23. The two snap arms 22 respectively extend from the fitting ends 21 to the handle body 23. This handle 20 is assembled with the bracket 10 into a desired folding handle assembly by inserting the opposite fitting ends 21 of the handle 20 into the opposite ends of the fitting hole 11 of the bracket 10.

A compression coil spring 30 is seated within the fitting hole 11 of the bracket 10 at a position between the two fitting ends 21 of the handle 20, thus normally biasing the two fitting ends 21 outwardly in opposite directions to give desired elasticity to the handle 20 without allowing an expected removal of the two fitting ends 21 from the fitting hole 11. That is, the two snap arms 22 are biased outwardly by the spring 30 to be reliably caught by the two stoppers 12 of the bracket 10.

In a brief description, the desired elasticity of the folding handle 20 is maintained for a lengthy period of time by the compression coil spring 30 seated within the fitting hole 11 of the bracket 10.

When cooking using the pan "K", the folding handle 20 is opened relative to the bracket 10, with the snap arms 22 of the handle being caught by the stoppers 12 of the bracket 10 as shown in FIGS. 2 and 3.

In such a case, the compression coil spring 30, seated within the fitting hole 11 of the bracket 10, appropriately biases the two fitting ends 21 of the handle 20 outwardly in opposite directions, thus allowing the two snap arms 22 to be reliably caught by the two stoppers 12 of the bracket 10. It is thus possible to almost completely prevent the snap arms 23 from being unexpectedly released from the stoppers 12 and the handle 20 from being unexpectedly collapsed even when the gripping force applied to the handle body 23 during a movement of the pan "K" carelessly exceeds a predetermined level. This finally allows a user to safely use the pan "K" while cooking.

When it is desired to close the folding handle 20 onto the top of the pan "K" so as to keep the pan "K" after using the pan "K", the handle body 23 is somewhat exceedingly compressed to release the two snap arms 22 from the stoppers 12 while compressing the coil spring 30 prior to rotating the handle 20 upward around the fitting hole 11 of the bracket 10. Of course, when the two stoppers 12 are specifically designed, it is possible to more simply close the handle 20 onto the top of the pan "K" through a one-touch motion, wherein the handle 20 is forcibly rotated upward around the fitting hole 11 of the bracket 10 without separately compressing the handle body 23. Such a specific design of the stoppers 12 for accomplishing the one-touch motion of the handle 20 is well known to those skilled in the art, and further explanation is thus not deemed necessary.

As described above, the present invention provides a folding handle assembly for cooking pans, comprising a bracket mounted to the external surface of a cooking pan at a desired position, and a folding handle movably assembled with the bracket, with a compression coil spring being seated within the fitting hole of the bracket at a position between the two fitting ends of the handle, thus normally biasing the two fitting ends of the handle outwardly in opposite directions to allow the snap arms of the handle to be reliably caught by the stoppers of the bracket. Due to the compression coil spring, it is possible for a user to safely manipulate the cooking pan while cooking. Another advantage of the present invention resides in that the folding handle assembly accomplishes its desired operational effect by seating only a simple coil spring within the bracket, and so the assembly is easily and simply produced at low cost.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A folding handle assembly for cooking pans, comprising a bracket mounted to an external surface of a cooking pan at a desired position, said bracket being formed by pressing a steel plate to have a horizontal fitting hole and two opposite stoppers, said stoppers being formed at positions around opposite ends of said fitting hole;

a folding handle movably assembled with the bracket, said folding handle being formed by specifically and symmetrically bending a steel wire to have two opposite fitting ends, two snap arms and a handle body, said folding handle being hinged to the opposite ends of said fitting hole of the bracket at its opposite fitting ends and selectively, elastically caught by inner surfaces of said two stoppers of the bracket at its two snap arms, and being gripped by a hand at its handle body as desired; and a coil spring seated within said fitting hole of the bracket at a position between the two fitting ends of the handle, thus normally biasing the two fitting ends of the handle outwardly in opposite directions to give the handle elasticity capable of allowing the two snap arms of the handle to be reliably caught by the two stoppers of the bracket.

\* \* \* \* \*